Sept. 21, 1965

H. F. IRVING 3,206,969

SLURRY DRAINAGE TESTING

Filed Dec. 14, 1961

INVENTOR.
HENRY F. IRVING
BY
ATTORNEYS

*INVENTOR.*
HENRY F. IRVING

United States Patent Office 3,206,969
Patented Sept. 21, 1965

3,206,969
SLURRY DRAINAGE TESTING
Henry F. Irving, Saginaw, Mich., assignor to Baker Perkins Inc., Saginaw, Mich., a corporation of New York
Filed Dec. 14, 1961, Ser. No. 159,382
10 Claims. (Cl. 73—63)

This invention relates to apparatus and methods for indicating the drainage rates of a slurry by measuring the quantity of liquid separated from the slurry in a particular period of time. The invention is particularly useful in providing for the continuous weighing of liquid discharged from centrifugal separators so as to provide data by means of which the drainage rate of the slurry material, and other information, can be calculated.

When designing separators, it is important to know in advance the speed at which the separator must be driven, the sizes of the openings through which material is to be passed, and the time required to effect separation. Few materials can be processed satisfactorily by the same separation apparatus, so it is preferable to subject a particular material to a small scale test operation to determine, firstly, what kind of separating apparatus may be required and, secondly the size and other characteristics of the apparatus required to effect the desired operations. In conducting centrifugal testing operations on a small scale, however, it is virtually impossible to determine accurately, by purely manual and visual means, the amount of filtrate discharged from a small centrifugal basket. Consequently, the data obtained from manual weighing of the filtrate is quite likely to be inaccurate, resulting in erroneous calculations for the design of the commercial size apparatus.

An object of this invention is to provide indicating apparatus incorporated with centrifugal separator means which is capable of continuously and accurately determining the quantity of material discharged from the centrifuge.

Another object of the invention is to provide apparatus of the kind referred to which is capable for use with materials of many different kinds.

A further object of the invention is to provide centrifugal separating apparatus that is constructed of easily obtainable relatively inexpensive parts which are simple to operate, but rugged and durable in use.

A further object of the invention is to provide an improved method of indicating continuously the amount of material discharged from a centrifugal separator during operation of the latter.

Other objects and advantages of the invention will be pointed out specifically or will become apparent from the following description when it is considered in conjunction with the appended claims and the accompanying drawings, in which:

Figure 2:
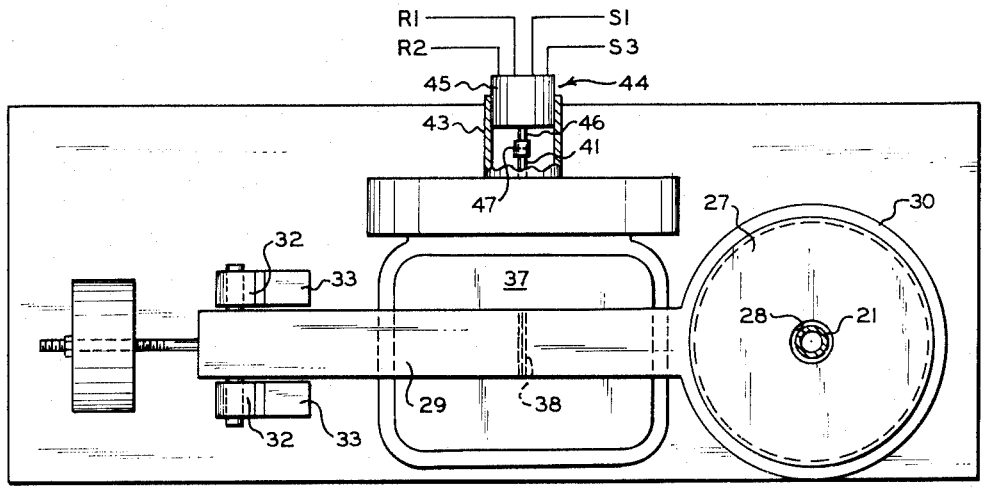
FIGURE 2 is a top plan view, partly in section, of the apparatus shown in FIGURE 1.
Figure 1:
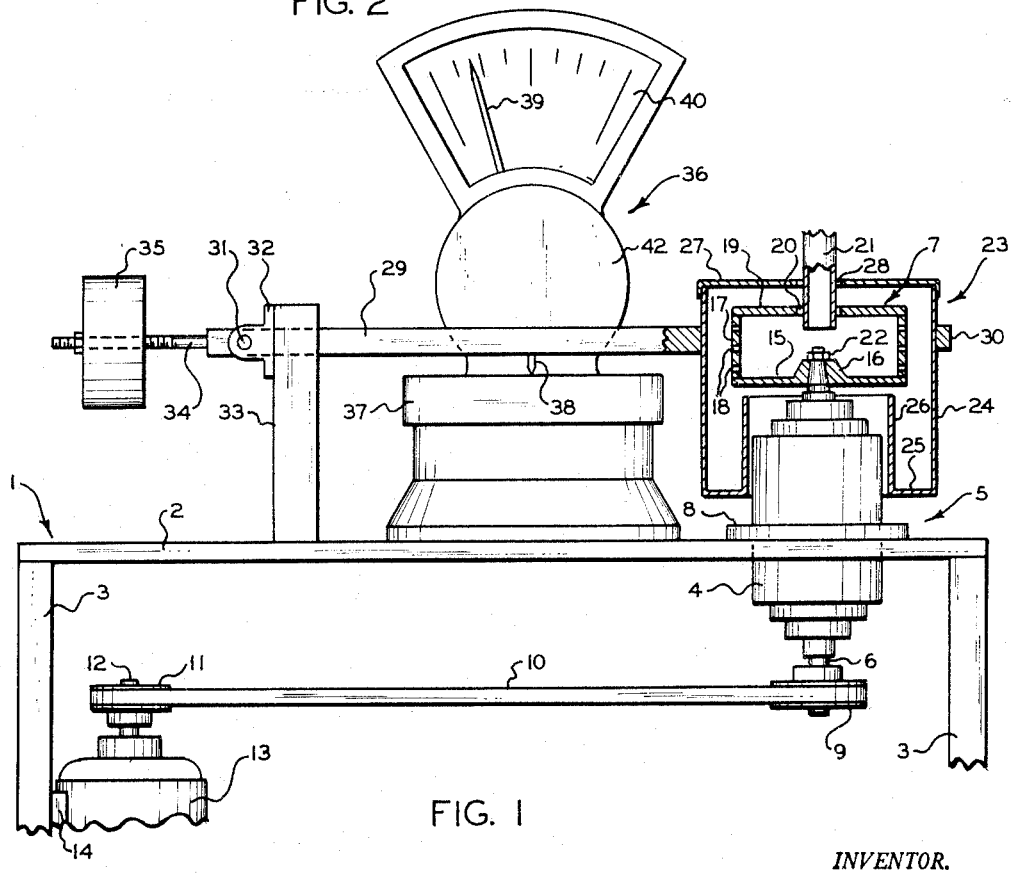
FIGURE 1 is a fragmentary, front elevational view, partly in section, of apparatus constructed in accordance with the invention.
Figure 3:
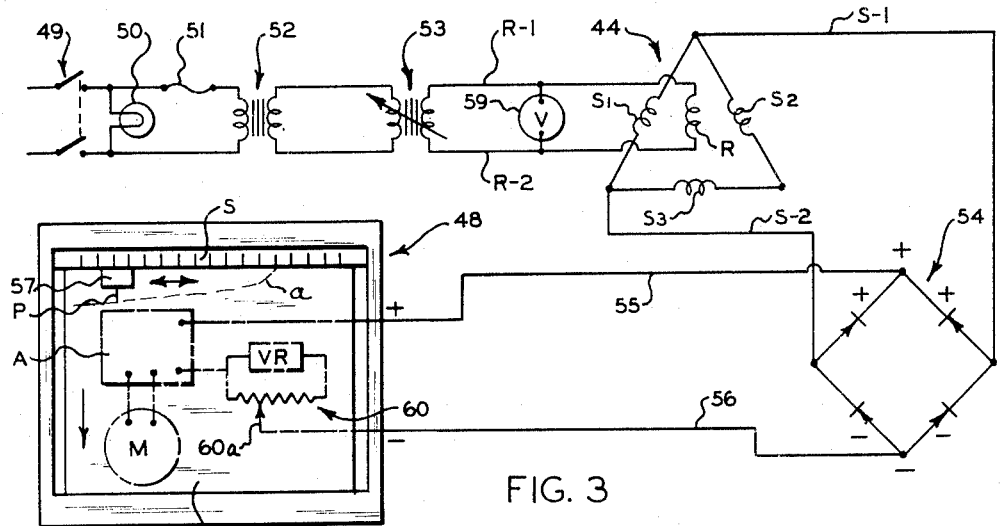
FIGURE 3 is a schematic wiring diagram of a circuit adapted for use in conjunction with the structure illustrated in FIGURES 1 and 2.

Apparatus constructed in accordance with the embodiment of the invention shown in FIGURES 1–3 comprises a support or base structure 1 such as a table having a flat, generally horizontal top 2 mounted upon a plurality of supporting legs 3. Adjacent one end the table top 2 is provided with an opening through which extends the housing 4 of a spindle mechanism 5 that includes rotatable spindle 6 which projects beyond the upper end of the housing 4 for removable reception of a rotatable centrifugal basket 7. The spindle housing 4 preferably includes an annular flange 8 that is adapted to rest upon the table top 2 and be secured to the latter by suitable means such as bolts (not shown). The lower end of the spindle 6 may have fixed thereto a pulley 9 around which is trained a driving belt or chain 10, the belt also being trained around a pulley 11 fixed to the armature shaft 12 of an electric motor 13 that may be mounted by brackets 14 on one of the legs 3. Rotation of the motor shaft 12 causes corresponding rotation of the spindle 6 and, consequently, rotation of the separator basket 7.

The centrifugal basket 7 includes an impervious bottom wall 15 that is centrally apertured to receive the upper end of the spindle 6, the bottom wall being reinforced as at 16 adjacent the spindle accommodating opening. The basket 7 is preferably cylindrical in shape and has sidewalls 17 provided with a plurality of openings 18 therein. A cover plate 19 may be fitted to the sidewalls 17 and is impervious except for a centrally located opening 20 through which extends a hollow filler tube 21 by which a slurry material can be introduced to the interior of the basket 7. The basket is removably secured to the spindle shaft 6 by a nut 22 or other device so as to permit baskets of other shapes and different size openings to be substituted for the basket 7.

The construction and arrangement of the parts thus far described are such that the motor 13 may be started so as to rotate the spindle 6 and the basket 7 at a desired rate of speed while a predetermined quantity of slurry material is introduced to the interior of the basket through the filler pipe 21. The rotation of the basket at a predetermined speed will cause the fluid in the slurry to be separated by centrifugal action from the solids in the slurry and the fluid will be discharged through the openings 18 of the basket.

Means is provided for receiving material discharged from the basket and comprises a non-rotatable receiver 23 having a generally cylindrical outer wall 24 joined at its lower end to an impervious bottom wall 25, the latter also being joined to an upstanding, annular inner wall 26 which may telescope over the spindle housing 4. The receiver may be fitted at its upper end with a removable cover 27 that is impervious except for an opening 28 which accommodates the filler pipe 21. Material discharged to the receiver from the basket 7 is collected on the outer and bottom walls 24 and 25 of the receiver, respectively, thereby adding to the weight of the latter.

The receiver 23 is mounted for movements in response to a change in the quantity of the material supported thereby. The mounting means for the receiver 23 comprises a lever arm 29 provided at one end with a ring 30 which receives and is fixed to the receiver wall 24 by any suitable means, such as welding. The lever 29 is provided adjacent its opposite end with a pin 31 which is rotatably journaled in a pair of journal supports 32 that are fixed to a pair of supporting posts 33 which extend upwardly from the table top 2. Adjacent the pivoted end of lever 29 is a threaded extension rod 34 on which is adjustably received a correspondingly threaded counter weight 35 by means of which the lever 29 may be balanced.

The lever 29 is capable of oscillating movements about the pivot 31 in response to changes in the weight of material contained in the receiver 23. Supported on the table top 2 between the receiver 23 and the supports 33 is a conventional platform scale 36 having a vertically movable platform 37 which underlies the lever 29. Preferably, the lever is provided on its lower surface with a knife edge 38 that is adapted to bear against the platform 37. The apparatus 36 preferably includes a movable pointer 39 that is adapted to sweep across an indicator scale 40 in accordance with vertical movements of the platform 37 so as to provide a visual indication of changes in the weight of the receiver. The pointer 39 may be connected at its lower end to a rotatable shaft 41 that is mounted within a housing 42, and which is caused to rotate by transmission means (not shown) interconnecting the shaft 41 and the platform 37. The transmission means is conventional in many kinds of platform scales such as a Toledo scale, for example, and its illustration is not deemed necessary.

As is indicated in FIGURE 2, the housing 42 is equipped with a rearwardly extending tube 43 into which the shaft 41 projects. Also received in the tube 43 is a variable voltage device such as a selsyn motor 44 having an external housing 45 of such size as snugly to be received in the tube 43. Extending from the selsyn housing 45 is a shaft 46 which is coupled by means of a coupling 47 to the scale shaft 41. The significance of these parts will be pointed out hereinafter.

Apparatus constructed in accordance with the embodiment of the invention illustrated in FIGURE 3 includes an electrically operable indicator or recorder 48 of a known kind and calibrated to indicate changes in the quantity of material discharged to the receiver 23. The recorder may be a single-pen, strip-chart, D.C. potentiometer recorder of the type HF manufactured by General Electric Company and described in the manufacturer's Bulletin 8259 of March 30, 1959. The recorder is connected in an electrical circuit that functions in response to movements of the receiver to control the operation of the recorder 48. The electrical circuit comprises a double pole single throw switch 49 that may be connected to a suitable source of alternating current. The switch circuit preferably includes a pilot light 50 to indicate operation of the apparatus and a fuse 51 to safeguard the apparatus against overload. Closing of the switch 49 will deliver electric energy to the primary winding of a voltage stabilizing transformer 52 of known construction, the secondary winding of which is connected to the primary winding of a well-known variable transformer 53. The secondary winding of the transformer 53 is connected by wires R-1 and R-2 to the rotor winding R of the variable voltage device 44. The rotor winding R is rotatably mounted within three stator windings $S_1$, $S_2$, and $S_3$ and these windings are connected by wires S-1 and S-2 to the input terminals of a conventional bridge type silicon rectifier device 54. The output of the rectifier 54 is delivered by wires 55 and 56 to the recorder 48 which has a reciprocable recording pen holder or slide 57 that is adapted to sweep longitudinally across a strip of vertically and horizontally lined paper 58 in accordance with the current delivered to the driving motor M of the recorder which is mechanically connected to and moves pen holder 57 and pen P to draw a curve $a$. The chart 58 is driven perpendicularly to the direction of travel of pen slide 57 by a timing motor (not shown) as is conventional for this type of slide wire recorder. In the recorder identified the timing motor is a Telechron type and a fixed horizontal scale S is provided.

Connected across the wires R-1 and R-2 is an A.C. voltmeter 59 which is operable in conjunction with the variable transformer 53 to regulate the voltage supplied to the winding R of the device 44. Within recorder 48 is a potentiometer 60 including a slide wire $60a$ also mechanically linked to the rebalancing motor M, whereby a zero setting for the beam 57 may be obtained. The unknown voltage is balanced against a known voltage from the voltage reference VR which may comprise a silicon diode and balance is achieved when the two opposing voltages are equal. It is an unbalanced voltage amplified by amplifier A which drives motor M and moves pen P and slide wire $60a$.

To condition the apparatus thus far described for operation, the switch 49 is closed so as to energize the electric circuit. The variable transformer 53 is adjusted until the desired reading is obtained on the voltmeter 59, and the potentiometer 60 is adjusted until a zero setting is obtained for the recording beam 57. As long as no material is discharged to the receiver 23, the electrical circuit will be in equilibrium and the arm 57 will be static, i.e., there will be no movement of the recording pen arm 57. Upon starting the motor 13, however, and introducing material to the container 7, some of the material will be discharged from the centrifugal basket 7 and will be received in the receiver 23, thereby increasing the weight of the latter and causing the receiver and the lever arm 29 to move downwardly by gravity. Downward movement of the lever 29 will cause corresponding movement of the platform 37 so as to rotate the shaft 41. Rotation of the shaft 41 will be transmitted to the shaft 46 so as to effect rotation of the rotor winding R of the motor selsyn 44. Relative movement of the windings of the motor selsyn will unbalance the electrical circuit so as to effect a change in the value of the current circulating from the stator windings to the rectifier 54 and from the rectifier to the recorder 48. The change in the value of the current will effect movement of the recording beam 57 an amount proportional to the current delivered to the beam driving motor, thereby recording on the roll 58 a change in quantity of material discharged from the basket 7 to the receiver 23.

When a particular batch of material has been delivered to the basket and no further deflection of the beam takes place, the operator knows that the separation is complete and he then may calculate the drainage rate of the material by noting from the roll 58 the time required to effect separation and the quantity of material separated.

Figure 5:
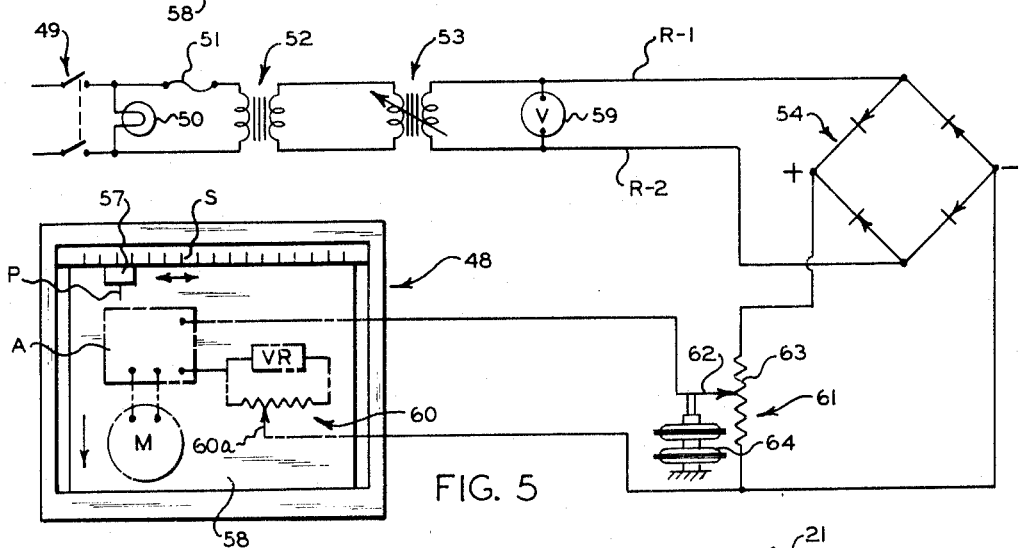
FIGURE 5 is a schematic wiring diagram of an electric circuit adapted for use in conjunction with the embodiment of the invention shown in FIGURE 4.
Figure 4:
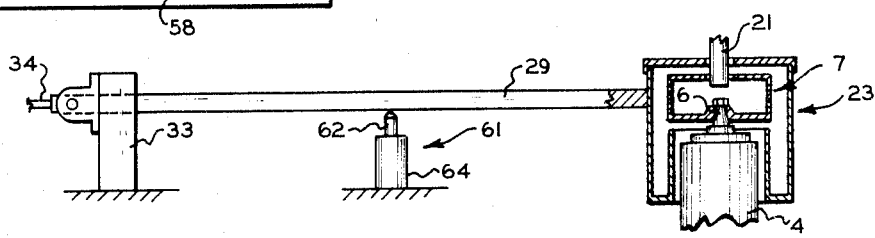
FIGURE 4 is a fragmentary view, similar to FIGURE 1, of a modified embodiment of the invention.

FIGURES 4 and 5 disclose a modified form of electrical apparatus that may be utilized in the invention. All those parts which are the same as earlier have been described are indicated by the same reference characters. In the modified construction, the scale 36 is replaced by a load cell comprising a potentiometer pressure transducer 61 of known construction having a vertically movable wiper arm 62 in engagement with the lever 29 for movement relative to a resistance 63 under the control of a diaphragm type pressure cell 64. The opposite ends of the resistance are connected to the output terminals of the rectifier 54 and the input terminals of the latter in this embodiment are connected directly to the transformer 53 by the wires R-1 and R-2. The wiper arm 62 is connected to the potentiometer 60 which regulates the voltage supplied to the driving motor of the recorder 48.

In the operation of the modified apparatus, the variable transformer 53 and the potentiometer 60 may be adjusted to balance the recorder circuit and obtain a zero setting of the pen holder 57. Thereafter, material may be discharged from the basket 7 in the manner previously described to cause the receiver 23 to move downwardly, thereby displacing the wiper arm 62 and unbalancing the recorder circuit so as to effect movement of the pen P. In all other respects, the operation of the modified embodiment is the same as has already been described.

Various other kinds of apparatus can be substituted for the motor selsyn 44 or the transducer 61 for accomplishing the desired results. For example, a Wheatstone bridge type load cell could be used in place of the device 61. This disclosure, therefore, is intended to be illustrative of the invention rather than definitive thereof. The invention is defined in the claims.

I claim:

1. Apparatus for comprising a container member adapted to contain a quantity of material; means operable to centrifugally discharge material from said container member; a receiver member telescoped with said container member for receiving directly from the latter material discharged from said container member; means mounting one of said members for gravitational movement in response to a change in the quantity of material therein; recording means operable to record a change in the quantity of material in said one of said members; and operating means reacting between said one of said members and said recording means for operating the latter in response to movement of said one of said members.

2. Apparatus comprising a rotatable container member adapted to contain a quantity of material; means for rotating said container member at a speed to discharge material therefrom; a receiver member telescoped with said container member for receiving directly from the latter material discharged from said container member; means mounting one of said members for gravitational movement in response to a change in the quantity of material therein; indicating means operable to indicate a change in the quantity of material in said one of said members; and operating means reacting between said one of said members and said indicating means for operating the latter in response to movement of said one of said members.

3. Apparatus comprising a rotatable container member adapted to contain a quantity of material, said member having a selected number of openings therein through which material may be discharged from said member upon rotation of the latter; means connected to said container member for rotating the latter; a receiver member telescoped with and surrounding said container member for receiving material discharged from the latter; means mounting one of said members for gravitational movement in response to a change in the quantity of material therein; indicating means operable to indicate a change in the quantity of material in said one of said members; and operating means reacting between said one of said members and said indicating means for operating the latter in response to movement of said one of said members.

4. Apparatus as set forth in claim 3 wherein said container member comprises a cylindrical basket having a bottom and side walls, said openings being in said side walls.

5. Apparatus as set forth in claim 4 wherein said basket is removably connected to said rotating means.

6. Apparatus comprising a container member adapted to contain a quantity of material; means operable to discharge material from said container member; a receiver member telescoped with said container member for receiving directly from the latter material discharged from said container member; means mounting one of said members for gravitational movement in response to a change in the quantity of material therein; electrically operated indicating means; electrical circuit means connected to said indicating means for supplying the latter with a selected quantity of electrical energy when said one of said members contains a predetermined quantity of material; and operating means reacting between said circuit means and said one of said members operable to vary the supply of electrical energy to said indicating means in response to movement of said one of said members.

7. Apparatus as set forth in claim 6 wherein said operating means comprises variable voltage means.

8. Apparatus as set forth in claim 6 wherein said operating means comprises variable resistance means.

9. Apparatus comprising a rotatable container for containing a quantity of material; means for rotating said container at a speed to discharge material therefrom; a receiver telescoped with said container for receiving directly from the latter material discharged from said container; means mounting said receiver for movement under the influence of the weight of material received therein; an electrically operable indicating device for indicating movement of said receiver; circuit means connected to said device for supplying the latter with energy from a source thereof; control means in said circuit operable to control the energy supplied to said device; and means interconnecting said container and said control means for operating the latter in response to movement of said container.

10. A method of measuring the centrifugal drainage rate of a slurry from a centrifugal separator in terms of the weight of liquid separated over a period of time comprising the steps of: revolving said separator to separate liquid and solid materials; continuously weighing the liquid thrown off; and continuously recording the weight of the liquid discharged on a chart indicating the time elapsed during the separation.

References Cited by the Examiner

UNITED STATES PATENTS

| | | | |
|---|---|---|---|
| 2,090,077 | 8/37 | Thorne | 73—61 |
| 2,304,875 | 12/42 | Barnart | 73—53 |
| 2,379,835 | 7/45 | Sisler | 73—63 |
| 2,873,107 | 2/59 | Lyons | 177—211 |
| 2,932,401 | 4/60 | Tholl | 210—369 |

OTHER REFERENCES

Publication: Review of Scientific Instruments, vol. 29, December, 1958, pages 1135–1138, article by Cochran "Automatic Recording Vacuum Microbalance."

LOUIS R. PRINCE, *Primary Examiner.*

DAVID SCHONBERG, RICHARD QUEISSER,
*Examiners.*